2,909,437
Patented Oct. 20, 1959

2,909,437

WAX POLISH

Richard G. Landwerlen, Indianapolis, Ind., and Hans W. Vahlteich, Englewood, N.J., assignors to Corn Products Company, a corporation of Delaware No Drawing. Application September 12, 1957
Serial No. 683,468

8 Claims. (Cl. 106—10)

This invention relates to a novel wax composition which is especially useful as a polish for leather goods, automobiles, furniture and the like.

The use of carnauba wax in wax paste polishes requires taking special precautions to manufacture a satisfactory commercial polish. Carnauba wax per se is capable of giving a high mirror-like shine, but unfortunately it has several disadvantages, such as the tendency to chalk, it is diffcult to buff and possesses poor solvent holding properties. To overcome these disadvantages, at present, it is the practice in the industry to blend carnauba wax with other types of waxes. This is accomplished by heating the mixture of carnauba wax and the other wax in a hydrocarbon solvent to effect complete solution and then cooling to produce a wax paste which is suitable as a polish. Blending of another wax with carnauba wax has overcome some of the poor qualities of carnauba wax, but such polishes do not have the shine or superior gloss feature which is characteristic of carnauba wax alone. For some unexplainable reason, the desired inherent gloss of carnauba wax is diminished by the presence of another wax, and additionally the polish product tends to be susceptible to marring and it is hazy or lacks clarity.

Therefore, an object of this invention is to provide a novel wax polish which has the unusual gloss of carnauba wax.

Other objects and advantages of this invention will become apparent from the following description and explanation thereof.

The novel composition of the present invention comprises carnauba wax in combination with an alkyl diester of citric acid or dialkyl citrate in which the alkyl radicals contain from about 12 to 22 carbon atoms.

More particularly, the invention is concerned with a wax paste polish containing carnauba wax, dialkyl citrate and a fatty alcohol having about 12 to 22 carbon atoms. The carnauba wax may be present alone or in combination with another wax which may be of animal, vegetable or mineral origin. In such case it is preferred that the mixture of waxes be employed with a hydrocarbon solvent to facilitate uniform mixing.

For reasons not clearly understood, dialkyl citrate cooperates with carnauba wax to produce a polish which is easily buffed, has excellent setting properties and can produce a shine having the inherent high gloss of carnauba wax without its tendency to chalk. The combination of the citrate and carnauba wax has excellent solvent holding properties and for that reason it can be admixed with other wax fractions to produce a variety of different types of wax paste polishes. The citrate contains two esterifying radicals of the alkyl type and these can have from about 12 to 22 carbon atoms. Specific examples of citrates which may be used for the purpose of this invention are: dioleyl citrate, distearyl citrate, dicetyl citrate, diarachidyl citrate, dilauryl citrate, etc. These diesters may be prepared by the method which is disclosed in U.S. Patent No. 2,485,639. In general, the citrate is present in the polish in an amount of about 0.3 to 15% by weight, preferably 0.3 to 5% by weight, based on the total composition. The quantity of citrate may be varied outside of the range although the results obtained are less satisfactory.

As previously mentioned, carnauba wax alone was known to be capable of giving a high shine or gloss but polishes containing carnauba wax did not possess the inherent gloss of carnauba wax because the measures taken to overcome the objectionable properties of the wax masked or diminished its high gloss feature. Desirably the polishes of the present invention always contain carnauba wax and they possess the high gloss feature which is characteristic of carnauba wax above. In general, the polishes contain about 5 to about 25% by weight, preferably about 5 to 10% by weight, of carnauba wax based on the total composition. This quantity can be varied from the amount stated although less satisfactory results are obtained. Carnauba wax can be the only wax ingredient in the polish or it is used in combination with other wax materials of animal, vegetable or mineral origin. Specific examples of other types of waxes include beeswax, spermacetic wax, ouricury wax, palm wax, candelilla wax, sugar cane wax, paraffin wax, montan wax, microcrystalline wax, ozokerite wax, etc. Whenever carnauba wax is used in admixture with another wax the resultant polish contains about 10 to about 30% by weight of total wax material, based on the total composition.

The presence of the second wax component in the polishes of this invention does improve the solvent holding property of carnauba wax, reduces its tendency to chalk, makes it easier to buff the wax and provides good setting properties notwithstanding the presence of the citrate. The second wax component cooperates with the citrate to give improvements which are greater than the summation of the individual effects obtained by either the second wax component or the citrate alone. Therefore, for this invention it is preferred to use the second wax component because it reduces the quantity of citrate which is needed to overcome the inherently poor properties of carnauba wax.

Whenever a second wax component is used with carnauba wax, it is preferred to employ a hydrocarbon solvent in order to obtain uniform mixing of the two. The solvent can be used even when the second wax component is not present in the wax. The hydrocarbon solvent which are useful for this purpose are the terpene hydrocarbons or the paraffinic hydrocarbons boiling in the naphtha range. The terpene hydrocarbons include, for example, turpentine, alpha pinene, beta pinene, dipentene, para cymene, etc., whereas the paraffinic hydrocarbon is a petroleum naphtha fraction having an initial boiling point of about 85° to 375° F. and an end point of about 260° to about 575° F., measured by the ASTM distillation method. The quantity of hydrocarbon solvent which is employed in the composition ranges from about 15 to about 85% by weight, and preferably about 65 to about 75% by weight, based on the total composition. The terpene hydrocarbon and naphtha also provide a polish of better consistency than can be more readily applied.

There may be also added to the composition a fatty alcohol containing about 12 to 22 carbon atoms. The fatty alcohol aids in clearing the shine of the polish on leather goods and, therefore, provides a gloss which has greater light reflectance to the eye than a polish without the same. This finding was unexpected in view that the citrate produced an exceptional improvement in polishes containing carnauba wax, and it appeared that no further improvement could be made. The improvement in the polish shine is not great, but the magnitude of change does warrant the use of the fatty alcohol in commercial polishes. The fatty alcohols which can be used for this purpose are, for example, cetyl alcohol, stearyl alcohol, behenyl alcohol, oleyl alcohol, ricinoleyl alcohol, arachidyl alcohol, myristyl alcohol, lauryl alcohol, etc. The quantity of alcohol which is used in the polish composition is about 0.25 to about 2.5% by weight, based on the total composition.

Other addition agents may be used in the manufacture of the polishes of this invention. For example, an odorant such as nitrobenzene can be incorporated into the wax paste polish in an amount not more than 0.5% by weight, based on the total composition. A phosphatide or lecithin can be added to the composition to improve the appearance of the polish surface. Usually it is employed in the amount of about 0.03% to 1.0% by weight of the total mass. Fatty acid esters of polyhydric alcohols can also be used, the type and quantity of such fatty acid esters being disclosed in Patent No. 2,776,268. Additionally, the thermoplastic synthetic resins which are disclosed in the said patent may be used in the polish of this invention.

In making the polishes of this invention, the wax component, carnauba wax with or without the admixture of one or more other wax, is melted at a temperature of, for example, 220° F. and stirred for one-half hour to insure complete melting. In a separate container, the thermoplastic resin, if used, is mixed with the hydrocarbon solvent and heated to 140° F. The solvent mixture is cooled to about 80° F. The wax is cooled to 200° F. and the dialkyl citrate is added thereto. Then the wax is cooled to 180° F. The solvent mixture is added to the wax and the total mass is agitated. The resultant temperature is about 118° F. The mass is reheated to 130° F., at which point the lecithin is added. Alternatively, the citrate can be mixed with the wax fraction to be melted at the first stage of the preparation. The mass is allowed to cool to a finished product.

In order to evaluate the present invention, various experiments were conducted. Initially a comparison was made between a simple polish containing carnauba wax without the citrate and one in which such polish contained the citrate. The examples below illustrate this comparison.

Example 1

| | Percent by weight |
|---|---|
| Carnauba wax | 20.0 |
| Dioleyl citrate | 5.0 |
| Petroleum naphtha | 75.0 |
| | 100.0 |

Example 2

| | Percent by weight |
|---|---|
| Caranuba wax | 20.0 |
| Petroleum naphtha | 80.0 |
| | 100.0 |

Example 2 is typical of a polish which has a strong tendency to chalk, exhibits poor solvent holding properties, and has a mediocre shine. By the addition of 5% dioleyl citrate the composition improved materially in that it became easily buffed to a full and brilliant shine, it showed no tendency to chalk, it exhibited good solvent holding properties, and the shine was typical of carnauba wax. As a result of the comparison given above, various other compositions were made in which the ingredients were typical of polishes presently sold on the market except that the citrate was also included. In each case the composition had the shine characteristic of carnauba wax without the disadvantages with regard to buffing and solvent holding properties, etc. These compositions are as follows:

Example 3

| | Percent by weight |
|---|---|
| Carnauba wax | 6.25 |
| Adol 60 [1] | 0.25 |
| Candelilla wax | 8.25 |
| Montan wax | 1.25 |
| Glycerol monostearate | 1.00 |
| Beeswax | 1.50 |
| Paraffin | 8.00 |
| Thermoplastic coumarone-indene resin | 2.00 |
| Dyes | 0.50 |
| Lecithin | 0.50 |
| Dioleyl citrate | 0.50 |
| Nitrobenzene | 0.25 |
| Turpentine | 30.00 |
| Naphtha IBP=300° F., EP=400° F. | 39.75 |
| | 100.00 |

[1] 85% behenyl alcohol and 15% stearyl alcohol.

Example 4

| | Percent by weight |
|---|---|
| Carnauba wax | 5.25 |
| Cetyl alcohol, pure | 0.25 |
| Candelilla wax | 8.25 |
| Montan wax | 2.50 |
| Beeswax | 2.25 |
| Paraffin | 10.00 |
| Dyes | 0.50 |
| Lecithin | 0.50 |
| Dioleyl citrate | 0.50 |
| Nitrobenzene | 0.25 |
| Pinene | 10.00 |
| Naphtha IBP=300° F., EP=400° F. | 59.75 |
| | 100.00 |

Example 5

| | Percent by weight |
|---|---|
| Carnauba wax | 6.25 |
| Adol 60 [1] | 0.25 |
| Candelilla wax | 8.25 |
| Montan wax | 1.25 |
| Beeswax | 1.50 |
| Glycerol monoglyceride | 1.00 |
| Paraffin | 8.00 |
| Thermoplastic coumarone-indene resin | 2.00 |
| Dyes | 1.00 |
| Lecithin | 0.50 |
| Dioleyl citrate | 0.30 |
| Nitrobenzene | 0.25 |
| Turpentine | 30.00 |
| Naphtha IBP=300° F., EP=400° F. | 39.45 |
| | 100.00 |

[1] 85% behenyl alcohol and 15% stearyl alcohol.

Example 6

| | Percent by weight |
|---|---|
| Carnauba wax | 8.50 |
| Candelilla wax | 8.25 |
| Monoglyceride flakes | 2.25 |
| Paraffin | 10.00 |
| Thermoplastic coumarone-indene resin | 3.00 |
| Dyes | 1.00 |
| Lecithin | 0.50 |
| Dioleyl citrate | 15.00 |
| Nitrobenzene | 0.25 |
| Turpentine | 25.00 |
| Naphtha IBP=300° F., EP=400° F. | 26.25 |
| | 100.00 |

Example 7

| | Percent by weight |
|---|---|
| Carnauba wax | 8.50 |
| Candelilla wax | 6.25 |
| Beeswax | 2.50 |
| Monoglyceride flakes | 1.50 |
| Paraffin | 7.50 |
| Thermoplastic coumarone-indene resin | 2.00 |
| Dyes | 1.00 |
| Dioleyl citrate | 1.75 |
| Nitrobenzene | 0.25 |
| Lecithin | 0.50 |
| Turpentine | 35.00 |
| Naphtha IBP=300° F., EP=400° F. | 33.25 |
| | 100.00 |

Example 8

| | Percent by weight |
|---|---|
| Carnauba wax | 8.50 |
| Adol 60 [1] | 2.00 |
| Candelilla wax | 6.25 |
| Beeswax | 1.75 |
| Monoglyceride flakes | 1.50 |
| Paraffin | 7.00 |
| Thermoplastic coumarone-indene resin | 2.00 |
| Dyes | 1.00 |
| Distearyl citrate | 1.00 |
| Nitrobenzene | 0.25 |
| Lecithin | 0.50 |
| Turpentine | 35.00 |
| Naphtha IBP=300° F., EP=400° F. | 33.25 |
| | 100.00 |

[1] 85% behenyl alcohol and 15% stearyl alcohol.

Having thus provided a written description of our invention along with specific examples thereof, it should be understood that no undue limitations or restrictions are to be imposed by reason thereof but that the present invention is defined by the appended claims.

We claim:

1. A wax polish consisting essentially of about 5 to 25% carnauba wax, a wax other than carnauba wax selected from the group consisting of animal, vegetable and mineral waxes, the total wax material constituting about 10 to 30%, about 65 to 75% hydrocarbon solvent, about 0.25 to 2.5% of a fatty alcohol containing from about 12 to 22 carbon atoms, and about 0.3 to 15% of a dialkyl citrate in which the alkyl radicals contain about 12 to 22 carbon atoms.

2. A wax polish consisting essentially of about 5 to 25% carnauba wax, about 65 to 75% of a hydrocarbon solvent and about 0.3 to 15% of a dialkyl citrate in which the alkyl radicals contain about 12 to 22 carbon atoms.

3. A wax polish consisting essentially of about 5 to 25% carnauba wax, about 51.25 to 85% of a hydrocarbon solvent and about 0.3 to 15% of a dialkyl citrate in which the alkyl radicals contain about 12 to 22 carbon atoms.

4. The composition of claim 3 wherein the hydrocarbon solvent comprises a mixture of a terpene hydrocarbon and naphtha.

5. The composition of claim 3 wherein the dialkyl citrate is a dioleyl citrate.

6. The composition of claim 3 wherein the dialkyl citrate is distearyl citrate.

7. A wax polish consisting essentially of about 5 to 25% carnauba wax, a wax other than carnauba wax selected from the group consisting of animal, vegetable and mineral waxes, the total wax material constituting about 10 to 30%, about 51.25 to 75% of a hydrocarbon solvent, and about 0.3 to 15% of a dialkyl citrate in which the alkyl radicals contain about 12 to 22 carbon atoms.

8. The composition of claim 7 wherein the hydrocarbon solvent is a mixture of a terpene hydrocarbon and naphtha and the dialkyl citrate is dioleyl citrate.

References Cited in the file of this patent

UNITED STATES PATENTS

| 2,118,521 | Pickens | May 24, 1938 |
| 2,741,563 | Robertson | Apr. 10, 1956 |
| 2,766,273 | Bruins et al. | Oct. 9, 1956 |